Patented Jan. 9, 1940

2,186,134

UNITED STATES PATENT OFFICE 2,186,134

PRESERVATIVE COMPOSITION

Alfred Dale Chapman, Chicago, Ill., and Ralph Melvin Lindgren, St. Paul, Minn., assignors to A. D. Chapman & Company, Inc., Chicago, Ill., a corporation of Illinois No Drawing. Application July 7, 1938, Serial No. 217,918

1 Claim. (Cl. 134—78.6)

This invention relates to a preservative composition comprising a halogenated phenol and an alkali metal salt of boric acid.

It has heretofore been proposed to dip, brush, spray, impregnate or otherwise treat wood with aqueous suspensions or solutions of chlorinated phenols or their salts, to secure it against the attack of wood-discoloring and wood-destroying fungi and of termites or other insects. It has also been proposed to treat similarly fabricated fibrous building material, such as wall-board, fiber board, insulation board and the like, as well as to incorporate therein chlorinated phenols or their salts at some stage of the manufacture thereof.

An aqueous solution containing at least five percent borax has also been found useful for preserving wood. The preparation and maintenance of this solution requires heating, since at ordinary temperatures borax is only soluble to an extent of 4 parts per 100 parts of water.

We have found that a preservative compound for wood or vegetable fibrous material comprising an alkali metal salt of a halogenated phenol and an alkali metal salt of boric acid effects a preservative action that far exceeds the sum total of the individual action of the components thereof when used separately.

It is therefore an object of this invention to provide a preservative composition comprising an alkali metal salt of a halogenated phenol and an alkali metal salt of boric acid which preservative composition is suitable for protecting wood and vegetable fibrous materials against the attacks of decay, stain and mold fungi, and insects and the like.

It is a further important object of this invention to provide wood or vegetable fibrous material having associated therewith an effective amount of a preservative composition comprising an alkali metal salt of a halogenated phenol and an alkali salt of boric acid.

Other and further important objects of this invention will become apparent from the following description and appended claims.

The vegetable fibrous materials to which, besides wood, this invention pertains are those fabricated from woody or other vegetable substances, wood pulp, mechanically or chemically liberated wood fibres, corn stalks, hemp, bagasse, cotton, linen and other vegetable fibres. Since, however, the invention assumes greater importance in connection with wood and the manufacture of wall board, insulating board, fibre board, and paper, it will be described chiefly in such connection.

A preservative composition according to this invention comprises an aqueous suspension or solution of an alkali metal salt of a halogenated phenol and an alkali metal salt of boric acid. We preferably employ the sodium salt of either a tetra- or pentachlorophenol, such as 2, 4, 5, 6 tetrachlorophenol, 2, 3, 4, 6 tetrachlorophenol or pentachlorophenol. The term "alkali metal salt of boric acid" refers to all alkali metal salts of boric acid that are neutral or basic. Thus, borax may be used alone or in conjunction with an amount of boric acid not sufficient to cause an acid reaction. One suitable ratio between the two component parts of the preservative composition is approximately one part by weight of the sodium salt of the chlorophenol to 1½ parts by weight of the alkali metal salt of boric acid.

When an aqueous dispersion or emulsion of a halogenated phenol is used, it is important that it should be in as finely a divided state as possible, so that its dispersion through the material treated can be effected readily. The emulsion may be passed through a colloid mill to insure a fine state of subdivision. Various wetting or dispersing agents may be employed, including the sodium salts of mono-alkyl esters of succinic acid, alkali metal and ammonium caseinates, blood albumen, sodium lauryl sulfate, salts of sulfonated phenyl phenols, sulfonated petroleum oils and salts thereof, sulfite waste liquors, residues and others.

Such a solution or emulsion may be applied to freshly cut lumber, timbers, poles, posts, veneers and the like by dipping, brushing, spraying or any other method effecting a thorough wetting. Finished or semi-finished fabricated vegetable fibrous or cellulosic materials of all kinds such as wall board, fiber board, insulation board, pulp and pulp products of various kinds may be treated similarly, or these materials may be impregnated with a hot solution of the above composition. In the case of ground wood or chemical pulp that is to be formed into laps, sheets or webs, the preservative composition may be incorporated into the fibre suspension ahead of the wet machine in which the lap, sheet or web is to be formed. The preservative compound may also be applied to the surface of the felted fibrous material during its formation, or prior to, during or after the drying step.

Obviously, it is more suitable to use a preservative composition comprising an aqueous solution of an alkali metal salt of a halogenated phenol, for instance, for impregnating a dry or green piece of lumber. Either an aqueous suspension or solution of, respectively, a free halogenated phenol or a water soluble salt thereof, and a borate, may be used for adding to a stock chest for incorporating with slush stock to be made into board in a closed system. The addition of alum or resin size to the slush stock will cause the precipitation of the halogenated phenol from its suspension or solution.

As disclosed hereinbefore, we have found that this mixed preservative effects a far greater toxic action towards insects and fungi than could be predicted from the individual action of its components. I have found, for instance, that a preservative compound according to this invention is much more effective than a solution of either of the components of my preservative compound of twice its concentration of the component in question. This makes possible the use of smaller quantities of halogenated phenols than must be used alone, with addition in place thereof of cheaper borax, so that the same preservative action can be obtained at a lower cost. It is also to be noted that while this preservative composition is highly toxic to insects and fungi, it is relatively non-irritating to workmen.

Other advantages accruing from the use of our preservative composition are the better color given to lumber than if either component thereof were used alone in effective amounts; the flame retarding action and the tendency of the preservative composition to reduce checking which is due to its borax content and which otherwise could only be effected by a hot borax solution; the stabilizing and buffering action of the alkali metal borate which keeps the halogenated phenols from being precipitated from their salt solutions by $CO_2$, especially if the solution is slightly alkaline.

A few illustrative examples of carrying out this invention will now be given. It is to be understood, however, that these examples are only a few of the many specific methods embodying the principles of this invention.

Example I

Freshly cut green lumber or veneer is dipped in a cold or hot aqueous solution of 0.5% sodium 2, 4, 5, 6, tetrachlorophenate and 0.75% borax. It is allowed to air dry after having been thoroughly wetted. This lumber will be found to be resistant against the attacks of stain and mold fungi and insects.

Example II

Dry or green lumber is impregnated with a hot aqueous solution comprising 2, 4, 5, 6 tetrachlorophenate and borax in such a manner that the dried wood will contain from about 0.5 to 2.0 lbs. per cubic foot of wood of tetrachlorophenate and borax in the ratio of 1:1.5.

Example III

A solution of 1% of tetrachlorophenate and 1.5% borax is sprayed onto the felted mat of fibrous material on the forming wire of a board machine or the like. The fabricated board will be found resistant against decay and mold fungi and termites.

Example IV

A suspension of finely divided pentachlorophenol in an aqueous borax solution to which boric acid has been added in an amount sufficient to effect neutrality is added to the stock chest of a board machine; the amount of suspension added is sufficient to effect a concentration of a pentachlorophenol borate 1:1.5 mixture of from 2 to 4 lbs. per ton in the finished pulp. The fabricated pulp will be resistant against fungi and insects.

Example V

During the manufacture of fiber board, sufficient sodium tetrachlorophenate and borax solution is added to the stock to cause the finished board to contain about 0.75% tetrachlorophenate and about 1.5% borax by weight.

The above disclosures of the principles of this invention coupled with the illustrative examples given in the preceding paragraphs will enable those skilled in the art to apply this invention to their particular conditions.

We are aware that numerous details of the process may be varied through a wide range without departing from the principles of this invention, and we, therefore, do not purpose limiting the patent granted hereon otherwise than necessitated by the prior art.

We claim as our invention:

A composition for use in the preservation of cellulosic materials from decay, stain and mold fungi, and insects, which comprises a water soluble mixture of a halogenated phenolic compound selected from the group consisting of alkali metal salts of tetrachlorophenol and pentachlorophenol, and an alkali metal borate, the ratio of alkali metal salt of the halogenated phenolic compound to the alkali metal borate being approximately that of 1 to 1.5.

ALFRED DALE CHAPMAN.
RALPH MELVIN LINDGREN.